US012584335B2

(12) United States Patent
Rieboldt et al.

(10) Patent No.: US 12,584,335 B2
(45) Date of Patent: Mar. 24, 2026

(54) LOCKING BAR ARRANGEMENT

(71) Applicant: EMKA BESCHLAGTEILE GMBH & CO. KG, Velbert (DE)

(72) Inventors: Gerd Rieboldt, Wuppertal (DE); Sebastian Nickel, Wuppertal (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 0 days.

(21) Appl. No.: 18/868,382

(22) PCT Filed: May 10, 2023

(86) PCT No.: PCT/DE2023/100338
§ 371 (c)(1),
(2) Date: Nov. 22, 2024

(87) PCT Pub. No.: WO2023/232181
PCT Pub. Date: Dec. 7, 2023

(65) Prior Publication Data

US 2025/0257596 A1 Aug. 14, 2025

(30) Foreign Application Priority Data

May 30, 2022 (DE) ..................... 10 2022 113 576.4

(51) Int. Cl.
*E05C 9/20* (2006.01)
*E05C 9/22* (2006.01)
*E05C 9/04* (2006.01)

(52) U.S. Cl.
CPC . *E05C 9/22* (2013.01); *E05C 9/04* (2013.01)

(58) Field of Classification Search
CPC ... E05C 9/00; E05C 9/008; E05C 9/04; E05C 9/20; E05C 9/22; E05C 9/045; E05C 9/046
See application file for complete search history.

(56) References Cited

U.S. PATENT DOCUMENTS 5,887,915 A 3/1999 Ramsauer
6,039,364 A 3/2000 Rieger
(Continued)

FOREIGN PATENT DOCUMENTS

CN 1796716 A 7/2006
CN 102465635 A 5/2012
(Continued)

OTHER PUBLICATIONS

European Patent Office, International Search Report (with English translation), International Application No. PCT/DE2023/100338, 7 pages, Aug. 31, 2023.
(Continued)

*Primary Examiner* — Chi Q Nguyen
(74) *Attorney, Agent, or Firm* — Thompson Hine LLP

(57) ABSTRACT

A rod lock for locking a door leaf on a door frame with at least one rod which can be arranged on the door leaf side and which is movable between a locking position in which the rod is locked to a lock holder which can be arranged on the door frame side, and an open position in which the rod is released from the lock holder. The movement of the rod is guided via a rod guide which can be arranged on the door leaf side. The lock holder and the rod guide have a centering device with two centering bevels for aligning the closed door leaf relative to the door frame, one of which can be used for doors hinged on the left and one of which can be used for doors hinged on the right.

17 Claims, 5 Drawing Sheets

(56) References Cited

U.S. PATENT DOCUMENTS

| | | | | |
|---|---|---|---|---|
| 7,761,958 | B2 * | 7/2010 | Alfredsson | E05D 7/1066 16/261 |
| 7,954,278 | B2 | 6/2011 | Schaaf | |
| 8,132,767 | B2 * | 3/2012 | Oh | F16B 35/06 248/220.21 |
| 8,413,939 | B2 | 4/2013 | Ramsauer | |
| 9,834,966 | B2 * | 12/2017 | Alfredsson | E05D 15/505 |
| 10,280,665 | B2 * | 5/2019 | Rieboldt | E05D 7/1061 |
| 11,898,392 | B2 * | 2/2024 | Rieboldt | E05D 7/1061 |
| 12,163,549 | B2 * | 12/2024 | Hall | F16B 2/22 |
| 12,167,550 | B2 * | 12/2024 | Roof | H01H 9/22 |
| 2014/0102155 | A1 * | 4/2014 | Lin | E05C 9/046 70/92 |
| 2016/0002954 | A1 * | 1/2016 | Ali | E05B 63/18 292/336.3 |
| 2018/0258675 | A1 * | 9/2018 | Rieboldt | E05D 7/1061 |
| 2020/0048945 | A1 * | 2/2020 | Zeitler | E05C 9/048 |
| 2020/0318398 | A1 * | 10/2020 | Underwood | E05B 77/14 |
| 2021/0388648 | A1 * | 12/2021 | Geraci | E05C 9/04 |

FOREIGN PATENT DOCUMENTS

| | | | |
|---|---|---|---|
| CN | 119421991 | A | 2/2025 |
| DE | 8625607 | U1 | 1/1988 |
| DE | 29713432 | U1 | 10/1997 |
| DE | 202007013934 | U1 | 3/2009 |
| DE | 202009005345 | U1 | 7/2009 |
| DE | 202011103606 | U1 | 12/2012 |
| DE | 202013103683 | U1 | 10/2013 |
| EP | 0783616 | B1 | 6/1998 |
| EP | 0890696 | A2 | 1/1999 |
| EP | 1045098 | A1 | 10/2000 |
| WO | 2005052296 | A1 | 6/2005 |
| WO | 2010115544 | A1 | 10/2010 |

OTHER PUBLICATIONS

The International Bureau of WIPO, International Preliminary Report on Patentability (with English translation) issued Nov. 7, 2024, which pertains to PCT Application No. PCT/DE2023/100338, 8 pages.

* cited by examiner

LOCKING BAR ARRANGEMENT

This application is a national stage filing of International (PCT) Application No. PCT/DE2023/100338, corresponding to International Publication No. WO 2023/232181 filed on May 10, 2023, which in turn claims priority to German Application No. 10 2022 113 576.4 filed on May 30, 2022. The entire contents of both of those applications are hereby incorporated by reference.

The disclosure relates to a rod lock, in particular a plastic rod lock, for locking a door leaf on a door frame with at least one rod which can be arranged on the door leaf side and which can be moved back and forth between a locked position, in which the rod is locked to a lock holder which can be arranged on the door frame side, and an open position, in which the rod is released from the lock holder, the movements of the rod being guided via a rod guide which can be arranged on the door leaf side.

BACKGROUND

Such rod lock are used in many areas of technology, especially in industrial applications.

The rod locks are used to lock a door in its closed position. In the closed position of the door, the door leaf, which is movably attached to a door frame via several hinges, is locked against the door frame so that the door leaf can only be opened after the lock has been released. The term “door leaf” should be understood to mean all types of closing elements, including flaps, hatches, windows or other closing elements. The term “door frame” should be understood to mean all types of corresponding counterparts that enclose the door opening.

Rod locks have at least one axially movable rod that can be moved back and forth between a locked position and an open position. The rod is usually arranged on the door leaf and interacts in a locked manner with a lock holder arranged on the door frame. In the locked position of the rod, it engages behind a locking structure of the lock holder. In the open position, the rod can be released from the lock holder. The rod locks often also have a rod guide arranged on the door, via which the axial movement of the rod is guided.

With many types of doors, especially heavy doors that are frequently opened and closed, it is known that the door leaves tend to sag downwards over time on the side opposite the hinges due to the effects of gravity and wear. This is often not a problem for the function of the door, but the sagging of the door leaf often leads to an undesirable, uneven appearance of the closed door. With many doors, it is therefore necessary in practice to adjust the door leaf in relation to the door frame from time to time in order to compensate for the door sagging that occurs over time. Mechanically complex adjusting devices are often provided for this purpose, which have to be readjusted manually.

A less complex alternative for other types of doors is to provide a centering structure on the door frame and the door leaf, which automatically centers the door leaf when the door is closed, i.e. brings it into a defined alignment with the door frame. Centering structures of this type do not require manual adjustment to compensate for the door sag and also do not require a complex adjustment mechanism. However, they have proven to be disadvantageous in situations in which a door leaf is to be used with both left and right-hinged doors. In this case, it is often necessary to dismantle the centering structures, reposition them according to the respective hinge situation and then mount them accordingly, which involves a certain amount of assembly work.

SUMMARY

Against this background, the present disclosure can provide a rod lock which allows the door sag to be compensated for in a simple and easy-to-install manner.

This can be achieved in a rod lock of the type mentioned above in that the lock holder and the rod guide have a centering device with two centering bevels for aligning the closed door leaf relative to the door frame, one of which can be used optionally for doors hinged on the left and one of which can be used optionally for doors hinged on the right.

In this respect, the lock holder and the rod guide have a dual function. The two elements are not only used to lock or guide the rod of the rod lock, but also to align the closed door leaf with the door frame. The door sag can be compensated for via the centering device. Due to the two centering bevels, it is not necessary to reposition the centering device when changing the door leaf from a left-hinged door to a right-hinged door or vice versa. Instead, one of the two centering bevels can be used for the respective hinge situation. The other remains unused. This results in easy-to-install compensation of the door sag via the lock holder and the rod guide.

In an embodiment, the centering device has at least one projection and one recess on which the centering bevels are arranged. The projection and the recess can interact with each other when the door is closed and create the desired centering via the centering bevels.

In this context, a further embodiment provides that the projection and/or the recess have the shape of a trapezoid, in particular an isosceles trapezoid, with the centering bevels being formed by the legs of the trapezoid. The trapezoidal projection, guided by the centering bevels, can easily penetrate into the trapezoidal shape of the recess, which acts like a funnel. This results in reliable centering that is less prone to errors.

A further embodiment is that the projection is arranged on the lock holder and/or the recess is arranged on the rod guide.

A design according to which the projection and/or the recess are formed in one piece on the lock holder and/or the rod guide is advantageous in terms of design. This minimizes the assembly effort, as it is not necessary to provide the projection and/or the recess in a separate assembly step.

A further embodiment is that the centering bevels each have at least two, in one case four, centering surfaces for guiding the relative movements of the rod guide with respect to the lock holder when the door is closed. The relative movements when closing the door can be guided via the centering surfaces. The at least two interacting centering surfaces also result in a favorable, large-area force transmission and thus comparatively low wear. In the case of four centering surfaces, wear can be further reduced. Furthermore, the four centering surfaces can be arranged symmetrically on both sides of the rod. This also results in a favorable, symmetrical introduction of forces.

A further embodiment in this context is that at least one, in one case two, centering surfaces are arranged on the lock holder and/or one, in one case two, centering surfaces are arranged on the rod guide. The opposing centering surfaces on the lock holder and the rod guide allow a defined relative movement with simultaneous favorable force application.

A further embodiment is that the lock holder and the rod guide have a central region for receiving the rod and two side regions arranged to the side of this, in which the centering bevels are arranged. In this way, the central region remains free to receive the rod.

The centering bevels in the side regions can each have two centering surfaces. This results in good guidance of the relative movement between the lock holder and the rod guide, while at the same time ensuring that the forces are introduced symmetrically on both sides.

A further embodiment provides for the centering bevels to be aligned mirror-symmetrically to a plane of symmetry and/or point-symmetrically to a point of symmetry. Due to the symmetrical alignment of the centering bevels, these can be used for both left and right-hinged doors of the same design without further measures.

Furthermore, it is suggested that the plane of symmetry extends normal to the direction of movement of the rod.

A further embodiment provides for the plane of symmetry to extend along a transverse central plane of the lock holder and/or the rod guide.

Finally, an embodiment according to which the lock holder and the rod guide are designed as plastic parts, in particular as injection-molded plastic parts, can be advantageous in terms of production technology. Alternatively or additionally, the rod can also be designed as a plastic rod, in particular as a flat plastic rod, which can offer advantages, particularly from a cost perspective, compared to rods that are otherwise often designed as galvanized metal rods.

In addition, a door with a door leaf and a door frame is proposed for solving the aforementioned problem, in which a rod lock with one or more of the features described above is provided. This can result in the advantages already explained in connection with the rod lock.

A design of the door provides for the door leaf to be attached to the door frame via at least one door hinge. It may be advisable to provide at least two hinges or, in the case of particularly heavy doors, three or more hinges.

An embodiment provides that the door hinge is fixed to the door frame via a hinge fixing point and the lock holder is fixed to the door frame via a lock holder fixing point, whereby the hinge fixing point and the lock holder fixing point are identical and/or arranged symmetrically to a vertical door center plane. In particular, the drilling pattern of the hinge attachment point and the fastener attachment point can be identical and/or arranged symmetrically to a vertical door center plane. This allows simple and installation-friendly processes when changing the door hinge, for example from a left-hinged door to a right-hinged door.

A further embodiment is that a door seal is arranged between the door leaf and the door frame and the rod lock is arranged outside the area sealed by the door seal. This results in a simple construction of the door and at the same time a simple sealing of the door interior.

BRIEF DESCRIPTION OF THE DRAWINGS

Further details and advantages of a rod lock according to the disclosure will be explained below with the aid of the attached drawings of an embodiment example.

DETAILED DESCRIPTION

Figure 1:
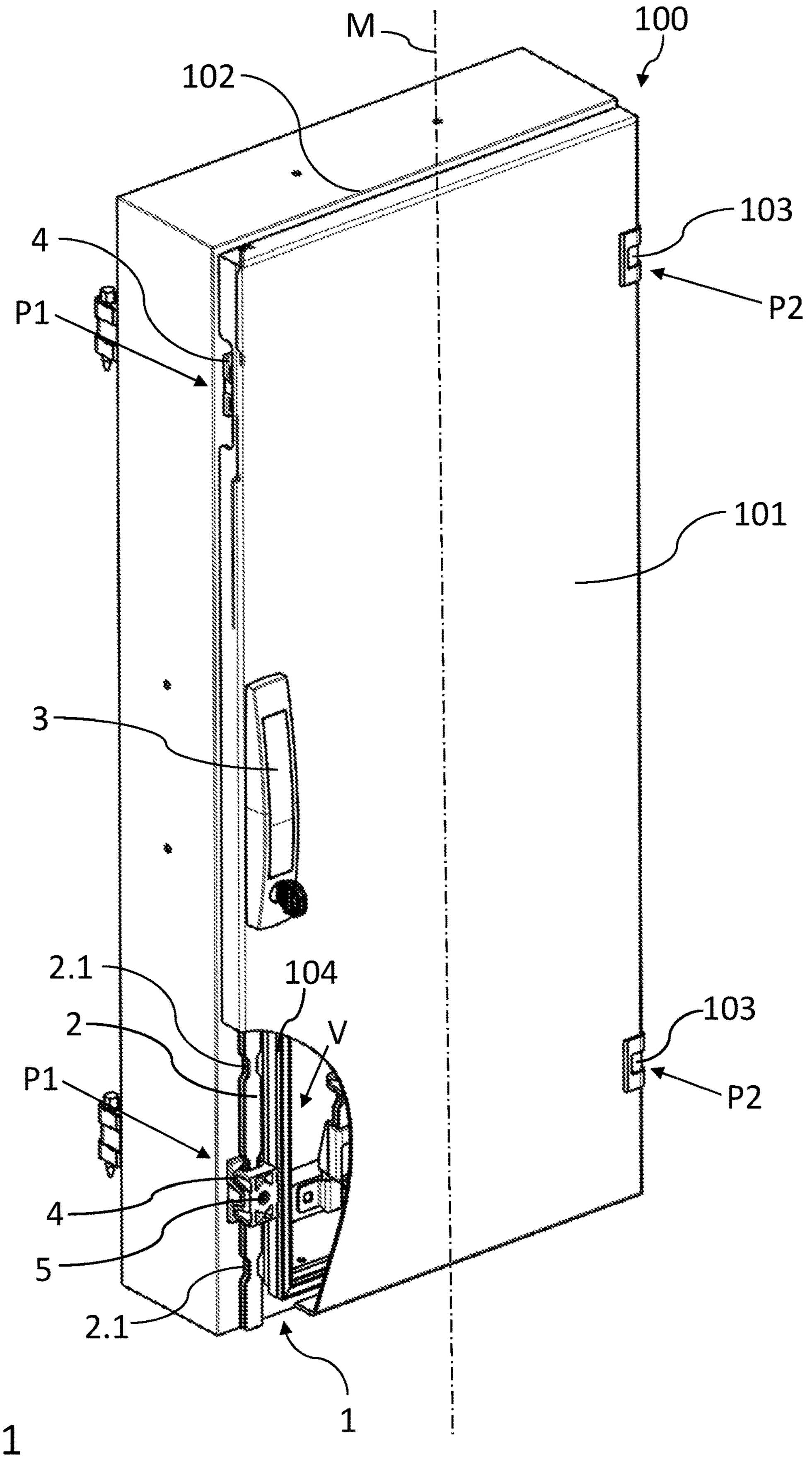
FIG. 1 is a perspective view of a door hinged on the right with an opening in the area of a lock holder point when the door is locked.

FIG. 1 shows a perspective view of a door 100 with a door leaf 101 and a door frame 102. The door leaf 101 is movably hinged to the right of the door frame 102 via two hinges 103.

A rod lock 1 is provided to lock the door leaf 101 against the door frame 102. The rod lock 1 is located outside a door seal 104, which is arranged circumferentially between the door leaf 101 and the door frame 102.

The rod lock 1 has a rod 2 that can be moved in an axial direction and is arranged so that it can be moved via an operating element 3. The rod 2 is made of plastic and is designed as a flat rod with an essentially rectangular cross-section. The rod 2 is arranged horizontally, i.e. the long side of its cross-section extends parallel to the plane of the door leaf 101. The operating element 3 is a pivoting lever handle, but other operating elements are also conceivable, for example lever handles, folding handles, folding lever handles, key plates with actuation or similar operating elements.

The rod lock 1 shown in the figures is designed with two rods, a lower rod 2 and an upper rod 2, which are moved towards or away from each other when the operating element 3 is operated. In the design example, two lock holders 4 are provided, to which the rods 2 are locked. This results in a 2-point locking mechanism. However, more locking points can certainly be provided, particularly for larger doors 100, by extending the two rods and increasing the number of lock holders 4. It is also possible to provide a further locking point in the area of the operating element 3, for example by means of a locking tongue or a similar locking element.

FIG. 1 shows the locking position V of the rod lock 1. In this position, the rod 2 lies behind a locking structure 4.1 of the lock holder 4, which is why it cannot be moved out of the lock holder 4. In order to open the door 100, it is necessary for the rod 2 to be moved axially in such a way that a narrow point 2.1 of the rod 2 enters the area of the lock holder 4 and the rod 2 can be moved out of the lock holder 4 in this way. This open position is shown in FIG. 2 and FIG. 3.

Figure 2:
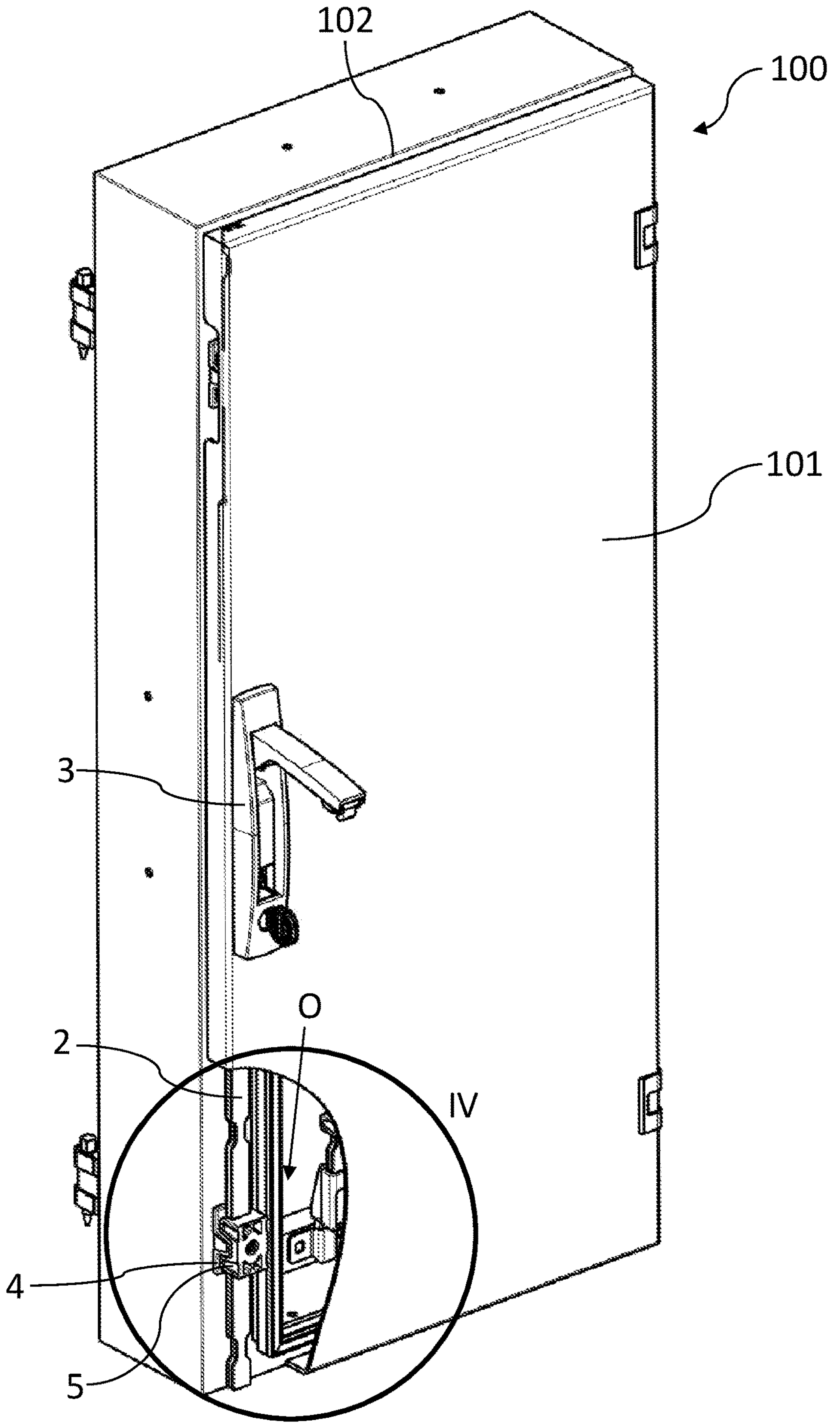
FIG. 2 is a view corresponding to that in FIG. 1 with the door unlocked.
Figure 3:
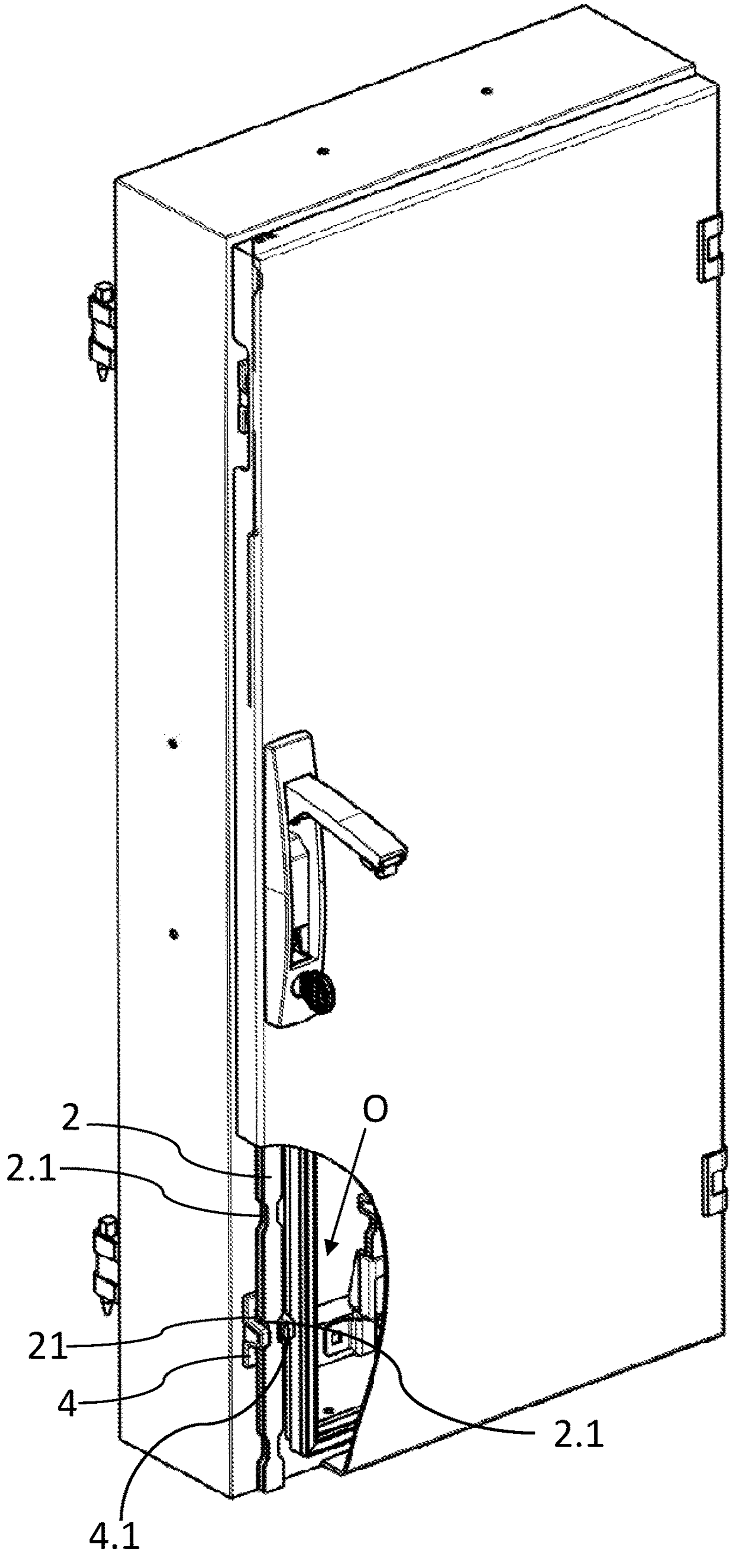
FIG. 3 is a view corresponding to the illustration in FIG. 2, in which a rod guide is not shown.

FIGS. 1 and 2 show a rod guide 5 of the rod lock 1 mounted on the inside of the door leaf 101, which guides the axial movements of the rod 2. The rod guide is not shown in FIG. 3, which is why it is somewhat easier to see in this drawing that in this position one of the narrow points 2.1 of the rod 2 is arranged in the area of the locking structures 4.1 of the latch holder and the rod 2 is therefore unlocked.

Figure 4:
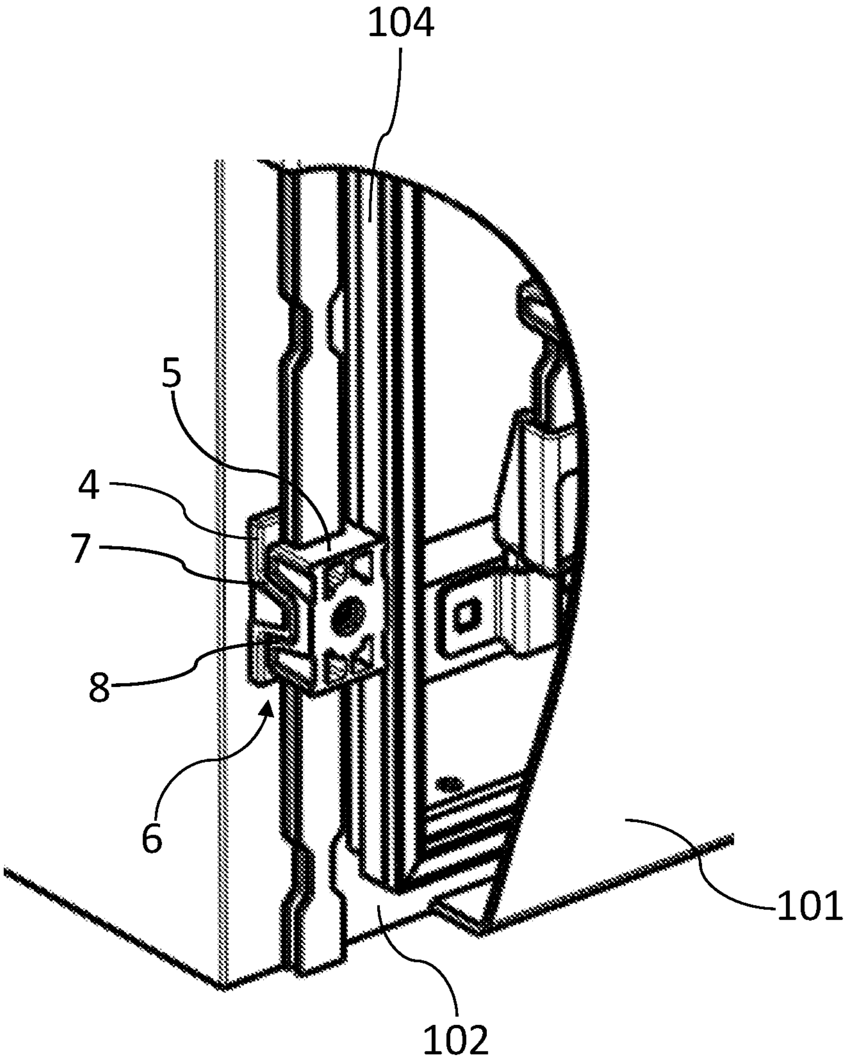
FIG. 4 is an enlarged detailed view according to the detail labeled IV in FIG. 2.

In addition to the locking function of the lock holder 4 and the guiding function of the rod guide 5, the lock holder 4 and the rod guide 5 also form a centering device 6, see FIG. 4. The lock holder 4 and the rod guide 5 have a dual function in this respect. The centering device 6 serves to compensate for any door sag that may occur over time and to achieve a symmetrical alignment of the door leaf 101 in relation to the door frame 102 when the door 100 is closed.

The centering device 6 has two centering bevels 7, 8 that run at an angle to the closing direction of the door 100. Only the upper centering bevel 7 is used to compensate for the door sag. The lower centering bevel 8 has no function in the stop situation shown in FIG. 4. The second centering bevel 8 only has a function when the door leaf 101 of the door 100 is not to be hinged to the right on the door frame 102, as shown in the figures, but is to be hinged to the left. In order to understand this, the processes involved in changing the door hinge will first be explained below.

FIG. 1 shows a door 100 hinged on the right. The door leaf 101 of the door 100 is hinged to the frame 102 via two hinges 103 in the right-hand area of the door leaf 101. There is a hinge fixing point P2 in the area of each hinge. The rod lock 1 is located on the left-hand side of the door 100. The rod lock 1 interacts in a locking manner with the lock holders 4 mounted on the door frame 102. A lock holder fixing point P1 is provided in the area of each of the lock holder 4.

To change the hinge of the door 100, first loosen the hinges 103 from the hinge fixing points P2. Then the lock holders 4 are also released from the lock holder attachment points P1. The lock holder fixing points P1 and the hinge fixing points P2 are identical to each other in the embodiment example and are formed by a double drill hole. It is therefore possible to interchange the hinges 103 and the lock holders 4. Alternatively, in the case of a drilling pattern with approximately three drill holes in a triangular arrangement, it would also be possible to arrange the corresponding drilling patterns symmetrically to the door center plane M of the door 100. In this case, too, the hinges 103 could easily be replaced with the lock holder 4. As soon as the lock holder 4 have taken the place of the hinges 103, the door leaf 101 can be rotated into an overhead position and attached to the door frame 102 via the door hinges 103 then arranged on the left-hand side of the door leaf 101. In a final step, the orientation of the operating element 3 must be changed by also rotating it through 180°.

However, the position or alignment of the rod guide 5 arranged on the inside of the door leaf 101 does not need to be changed. This can remain in its position on the inside of the door leaf 101 regardless of whether the door leaf 101 is used in a door 100 hinged on the left or right. After the door hinge has been changed and the door leaf 101 has been rotated 180° to an overhead position, the rod guide 5 is also in an overhead position. However, this is not a problem. This is because in this position, it is not the centering bevel 7 that is used to compensate for the door sag, but the centering bevel 8 at the top in this position. In this case, the centering bevel 7 has no function.

Details of both the lock holder 4 and the rod guide 5 will be explained below with reference to the illustrations in FIGS. 5 to 8.

Figure 5:
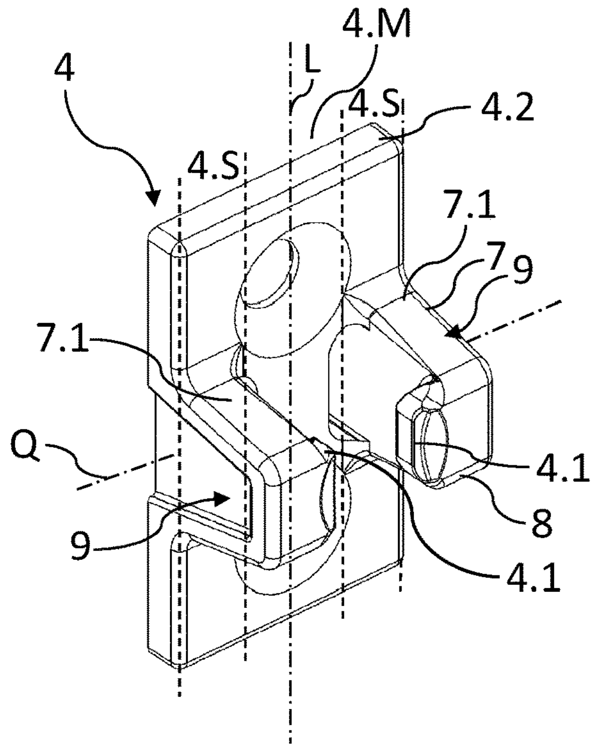
FIG. 5 is a perspective front view of a lock holder.
Figure 6:
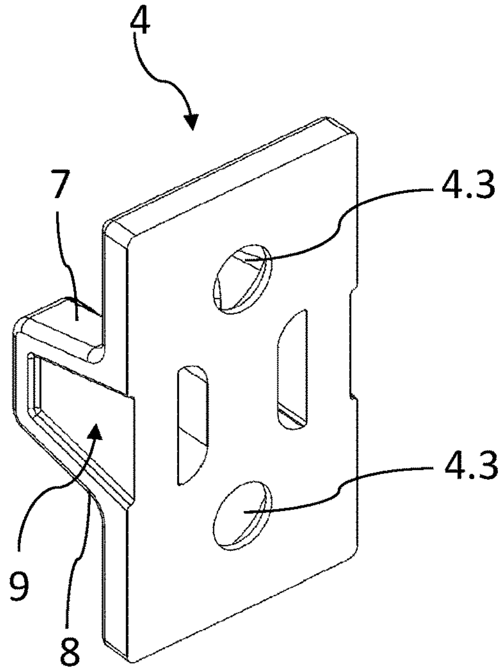
FIG. 6 is a perspective rear view of the lock holder according to FIG. 5.

FIGS. 5 and 6 show a perspective view of the lock holder 4. The lock holder 4 has a plate-shaped base body 4.2 and is fastened to the door frame 102 via two fastening holes 4.3. The lock holder 4 can be divided into three regions, a central region 4.M and two side regions 4.S. In each of the side regions 4.S, the lock holder 4 has a projection 9. The projections 9 have a trapezoidal contour. In the manner of an isosceles trapezoid, the projections 9 are arranged symmetrically to a transversal center plane Q of the lock holder 4. Furthermore, the projections 9 are arranged mirror-symmetrically to a longitudinal center plane L. The locking structures 4.1, on which the rod 2 can be locked, are located facing inwards from the projections 9. The centering bevels 7, 8 are located on the legs of the trapezoidal projections 9.

Figure 7:
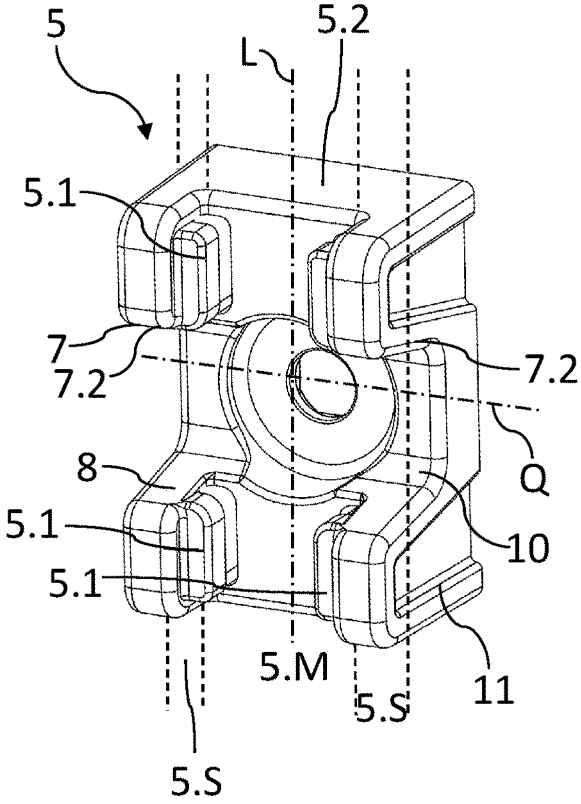
FIG. 7 is a perspective front view of a rod guide.
Figure 8:
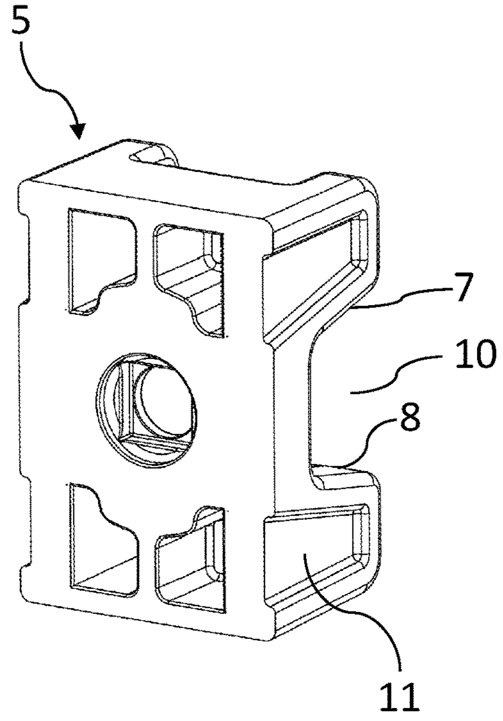
FIG. 8 is a perspective rear view of the rod guide according to FIG. 7.

As the illustrations in FIGS. 7 and 8 show; the rod guide 5 also has a plate-shaped base body 5.2. The rod guide 5 also has a central region 5.M and two side regions 5.S adjoining it at the sides. In the side regions 5.S there are lugs 11 projecting outwards at an approximately right angle, on each of which a trapezoidal recess 10 is formed. Above and below the recess 10, the tabs 11 have inwardly projecting guiding structures 5.1 for guiding the rod 2. The recess 10 has a trapezoidal geometry and has the centering bevel 7 on one side and the centering bevel 8 on the other side, which interact in a centering manner with the corresponding centering bevels 7, 8 of the lock holder 4. The recess 10 is arranged symmetrically to a transversal center plane Q and symmetrically to a longitudinal center plane L of the rod guide.

The design and arrangement of the projections 9 and the recesses 10 is such that the projections 9 can penetrate into the recesses 10 when the door 100 is closed. In each case, the centering bevel 7 at the top, which is arranged both on the projections 9 and on the recesses 10, causes the door leaf 101 to be aligned with the door frame 102. This is because when the door 100 is closed, the centering surfaces 7.1 on the lock holder side slide along the centering surfaces 7.2 on the rod guide side of the centering bevel 7 and thereby generate a defined lifting movement, which counteracts the door sag. As two centering surfaces 7.1 are provided in each of the two side regions 4.S, 5.S and two centering surfaces 8.2 are provided in each of the side regions 5.S, this results in a large-area and symmetrical introduction of the weight forces of the door leaf 101.

Only the top centering bevel 7 may be used. When the door hinge is changed, the other centering bevel 8, which is at the top in this position, is used.

The design of a rod lock described above not only allows the door leaf 101 to be locked to the door frame 102, but also makes it possible to compensate for any door sag at the same time. Even when changing the door leaf 101 from a left-hinged to a right-hinged position, the rod guide 5 does not have to be removed, but can remain on the door leaf 101. Two centering bevels 7, 8 are provided for this purpose, of which only one centering bevel 7, 8 is used at a time depending on the swing situation.

LIST OF REFERENCE SYMBOLS

1 Rod lock
2 Rod
2.1 Narrow point
3 Operating element
4 Lock holder
4.1 Locking structure
4.2 Body
4.3 Fastening hole
4.M Central region
4.S Side region
5 Rod guide
5.1 Guiding structure
5.2 Body
5.M Central region
5.S Side region
6 Centering device
7 Centering bevel
7.1 Centering surface
7.2 Centering surface
8 Centering bevel
8.1 Centering surface
8.2 Centering surface
9 Projection
10 Recess
11 Tab
100 Door
101 Door leaf

102 Door frame
103 Door hinge
104 Door seal
V Locking position
O Open position
P1 Lock holder fixing point
P2 Hinge fixing point
S Plane of symmetry
M Door center plane
L Longitudinal center plane
Q Transversal center plane Having described the invention in detail and by reference to the various embodiments, it should be understood that modifications and variations thereof are possible without departing from the scope of the claims of the present application.

What is claimed is:

1. A rod lock for locking a door leaf on a door frame with at least one rod, wherein said at least one rod is configured to be mounted on a door leaf side and wherein said at least one rod is movable to a locking position wherein the at least one rod is locked to a lock holder, wherein said lock holder is configured to be mounted on a door frame side, and wherein said at least one rod is movable to an open position wherein the at least one rod is released from the lock holder, wherein movement of the at least one rod is guided via a rod guide, wherein the rod guide is configured to be mounted on the door leaf side, and wherein the lock holder and the rod guide have a centering device with two centering bevels for aligning the door leaf relative to the door frame when the door leaf is in a closed position, wherein one of the centering bevels is usable when the door is hinged on the left and an other one the centering bevels is usable when the door is hinged on the right.

2. The rod lock according to claim 1, wherein the centering device has at least one projection and one recess, and wherein the centering bevels are arranged on the at least one projection and one recess.

3. The rod lock according to claim 2, wherein at least one of the projection or the recess have a shape of a trapezoid having a pair of legs, the centering bevels being formed by the legs of the trapezoid.

4. The rod lock according to claim 2, wherein the projection is arranged on the lock holder and/or the recess is arranged on the rod guide.

5. The rod lock according to claim 4, wherein at least one centering surface is arranged on the lock holder and/or one centering surface is arranged on the rod guide.

6. The rod lock according to claim 2, wherein the projection and/or the recess are integrally formed on the lock holder and/or the rod guide.

7. The rod lock according to claim 1, wherein the centering bevels each has at least two centering surfaces for guiding relative movements of the rod guide with respect to the lock holder.

8. The rod lock according to claim 1, wherein the lock holder and the rod guide have a central region for receiving the rod and two side regions arranged laterally thereof, wherein the centering bevels are arranged on the side regions.

9. The rod lock according to claim 8, wherein the centering bevels in the side regions each has two centering surfaces.

10. The rod lock according to claim 1, wherein the centering bevels are aligned mirror-symmetrically to a plane of symmetry and/or point-symmetrically to a point of symmetry.

11. The rod lock according to claim 10, wherein the plane of symmetry extends normal to a direction of movement of the rod.

12. The rod lock according to claim 10, wherein the plane of symmetry extends along a transverse central plane of the lock holder and/or the rod guide.

13. The rod lock according to claim 1, wherein the lock holder and the rod guide are plastic.

14. A door with a door leaf and a door frame including a rod lock according to claim 1.

15. The door of claim 14, wherein the door leaf is hinged to the door frame via at least one door hinge.

16. The door of claim 15, wherein the door hinge is fixed to the door frame via a hinge fixing point and the lock holder is fixed to the door frame via a lock holder fixing point, the hinge fixing point and the lock holder fixing point being identical and/or arranged symmetrically with respect to a vertical door center plane.

17. The door of claim 14, wherein a door seal is arranged between the door leaf and the door frame and the rod lock is arranged outside an area sealed via the door seal.

* * * * *